United States Patent
Selland et al.

[11] Patent Number: 6,050,579
[45] Date of Patent: Apr. 18, 2000

[54] AUTOMOTIVE RUNNING BOARD

[75] Inventors: Arthur E. Selland; Thomas G. Pfotenhauer; Mark L. Thompson, all of Fremont, Ohio; James Hayward, Grosse Point Park, Mich.

[73] Assignee: Aeroquip Corporation, Maumee, Ohio

[21] Appl. No.: 09/063,591

[22] Filed: Apr. 21, 1998

[51] Int. Cl.$^7$ ...................................................... B60R 3/00
[52] U.S. Cl. .......................... 280/163; 296/203; 296/204; D12/203
[58] Field of Search ................................ 280/163, 164.1, 280/607, 14.2; D12/203

[56] References Cited

U.S. PATENT DOCUMENTS

| | | | |
|---|---|---|---|
| D. 336,629 | 6/1993 | Hinrichs et al. ...................... | D12/203 |
| 4,042,537 | 8/1977 | Dahm et al. ....................... | 260/2.5 AP |
| 4,206,170 | 6/1980 | Sassaman et al. ...................... | 264/310 |
| 4,521,354 | 6/1985 | Engelke et al. ......................... | 264/46.6 |
| 4,591,160 | 5/1986 | Piragino .............................. | 273/167 R |
| 4,621,002 | 11/1986 | Kuhlmann et al. ....................... | 428/71 |
| 4,798,549 | 1/1989 | Hirsch ....................................... | 441/74 |
| 4,839,118 | 6/1989 | Labrie ..................................... | 264/46.5 |
| 4,847,024 | 7/1989 | Loren ..................................... | 264/466 |
| 4,850,913 | 7/1989 | Szabad, Jr. ................................ | 441/65 |
| 4,860,815 | 8/1989 | Parker et al. ............................. | 164/47 |
| 4,873,032 | 10/1989 | Kohlhase .................................. | 264/39 |
| 4,873,045 | 10/1989 | Fujita et al. ............................. | 264/259 |
| 4,874,649 | 10/1989 | Daubenbuchel et al. .............. | 428/36.5 |
| 4,975,229 | 12/1990 | Kita et al. ................................ | 264/45.2 |
| 4,992,224 | 2/1991 | Swenson et al. ......................... | 264/46.6 |
| 5,124,186 | 6/1992 | Wycech .................................... | 428/35.8 |
| 5,125,815 | 6/1992 | Kargarzadeh et al. ................... | 425/112 |
| 5,152,856 | 10/1992 | Thein et al. .............................. | 156/79 |
| 5,183,693 | 2/1993 | Rhodes, Jr. et al. .................... | 428/34.1 |
| 5,273,695 | 12/1993 | Brown et al. ............................ | 264/45.1 |
| 5,286,049 | 2/1994 | Khan ....................................... | 280/163 |
| 5,328,651 | 7/1994 | Gallagher et al. ...................... | 264/46.1 |
| 5,368,458 | 11/1994 | Addeo et al. ............................ | 425/4 R |
| 5,372,763 | 12/1994 | Hordis ..................................... | 264/46.5 |
| 5,382,035 | 1/1995 | Waddington et al. ................... | 280/169 |
| 5,468,433 | 11/1995 | Perry et al. .............................. | 264/46.4 |
| 5,474,721 | 12/1995 | Stevens ................................... | 264/45.3 |
| 5,480,714 | 1/1996 | Ito et al. .................................. | 428/324 |
| 5,500,169 | 3/1996 | Kondo et al. ............................ | 264/46.5 |
| 5,510,067 | 4/1996 | Jager et al. .............................. | 264/46.6 |
| 5,556,584 | 9/1996 | Yamazaki et al. ....................... | 264/46.5 |
| 5,769,439 | 6/1998 | Thompson ............................... | 280/163 |
| 5,823,553 | 10/1998 | Thompson ............................ | 280/164.1 |
| 5,924,718 | 7/1999 | Gordon et al. .......................... | 280/610 |
| 5,938,878 | 8/1999 | Hurley et al. ........................... | 156/219 |
| 5,944,336 | 8/1999 | Fagot ....................................... | 280/607 |

FOREIGN PATENT DOCUMENTS

| | | |
|---|---|---|
| 412617 | of 0000 | Belgium . |
| 02092786 | 4/1990 | Japan . |
| 09071186 | 3/1997 | Japan . |

OTHER PUBLICATIONS

JC Whitney Automotive Catalog, No. 576C, p. 106, col. 5, Item H; "Lund Fiberglass Acc.; Running Mates Running Boards", Mar. 1995.

*Primary Examiner*—Eric Culbreth
*Assistant Examiner*—L. Lum
*Attorney, Agent, or Firm*—Emch, Schaffer, Schaub & Porcello Co.

[57] ABSTRACT

The running board of the present invention provide the structural integrity to withstand the static and dynamic loads to which articles of this type are normally subjected. The design of the running board in terms of its configuration, the components making up the running board, namely, the blow molded exterior shell and the foam core, have specific structural characteristics. For example, the foam core has a density in the range of 100 kg/m$^3$ to 150 kg/m$^3$ and has sufficient resiliency to permit the part to return to substantially its original shape following removal of a load of predetermined magnitude.

13 Claims, 9 Drawing Sheets

AUTOMOTIVE RUNNING BOARD

TECHNICAL FIELD

The present invention is directed to an all plastic running board for a motor vehicle with improved compression load deflection.

BACKGROUND ART

In the manufacture of automotive vehicles, there is a continual evolution toward the use of plastic in the various parts and components. The use of plastics rather than steel for vehicle parts provides a desirable reduction in weight of the vehicles along with potential cost savings. Vehicle parts which are subjected to static and dynamic loads typically have had at least some portion thereof formed of metal. For example, although some running boards presently or previously used for motor vehicles utilized some plastic such as a fiberglass reinforced resin, such plastic was used in combination with steel or wood which functioned as the main structural component for such running board. The running board of the present invention is formed solely of plastic with the exception of metal bracket members for use in securing the running board to the vehicle.

DISCLOSURE OF THE INVENTION

The running board of the present invention provides the structural integrity to withstand the static and dynamic loads to which articles of this type are normally subjected. For example, in addition to the normal stresses to which a running board is subjected when a person steps upon it, it is also subjected external loads resulting from movement of the vehicle, particularly as it is subjected to the rises and depressions including bumps normally occurring on roads and highways. As the running board and the rest of the running board system, including the connectors to the vehicle, are subjected to the above-described loads, the running board system will generate a response. The response of such a system to external loads depends upon the natural frequencies and damping of the system, as well as on the frequency and the amplitude of the exciting forces. If one frequency of a harmonic excitation coincides with one of the natural frequencies of the system, the amplitude of vibration may become very large, potentially large enough to damage the running board system. Natural frequencies are dynamic characteristics of the running board system based upon its stiffness and inertia properties. The running board of the present invention is designed such that it provides a damping effect to prevent an excessive build-up of the response amplitude of the exciting forces to which the running board system is subjected.

In addition to the structural design of the running board in terms of its configuration, the components making up the running board, namely, the blow molded exterior shell and the foam core, have specific structural, resilience, chemical resistance and other characteristics required for such a system to perform satisfactorily under extremes of cold and heat. The outer shell should have good chemical resistance.

For example, with an exterior blow molded shell formed of a polycarbonate/polyester engineered thermoplastic, the foam core has a density in the range of 110 kg/m$^3$ to 150 kg/m$^3$ and has sufficient resiliency to permit the part to return to substantially its original shape following removal of a load of predetermined magnitude. If the density of the foam is too high, the foam will take on a permanent set when it is deflected.

A foam which is particularly satisfactory is one manufactured and sold by Bayer as its Bayfill EA4007. It is important that the foam have good thermal dynamic properties as will be shown in the following examples. In addition, thermal mechanical analysis of EA 4007 foam indicates a 1% penetration at 113° C. for the start of phase transition. Prior art foam undergoes 1% penetration at 80° C. and increases precipitously at 150° C. This may explain why the inventive foam offers unexpected thermal dynamic performance compared to typical prior art foams.

Bayfill EA4007 polyurethane energy absorbing foam at the following densities has the following tensile strength and elongation as measured by ASTM D 3774 E.

| Density, kg/m$^3$ | Tensile Str, kPa | Elongation % |
| --- | --- | --- |
| 112 | 1409 | 6.3 |
| 120 | 1519 | 6 |
| 128 | 1609 | 5.9 |
| 140 | 1783 | 5.5 |
| 150 | 1910 | 5.25 |

This EA4007 foam is a rigid or structural polyurethane foam. It is formed as the reaction product of two liquids, a polyisocyanate and a polyol blend. Polyol blends are mixtures that may contain polyhydroxyl compounds, amines, catalysts, surfactants, pigments, flame retardants, fillers, and water. The polyol blend is formulated to provide the required physical properties and processing behavior of the foam.

The plastic for the blow molded shell may vary widely. Besides the preferred polycarbonate/polyester engineered thermoplastic, a number of other engineered thermoplastics of similar performance properties may be used.

The final major component of the running board assembly of the present invention is a bracket, preferably metal, providing support for the running board with minimal deflection when subjected to predetermined loads. For specific cross-sectional sizes and shapes of the running board, including cross-sectional size of the foam core, the spacing between the brackets providing support therefor should not exceed a predetermined distance. The method of molding and the specific materials for the shell and core provide complete filling.

IN THE DRAWINGS

DESCRIPTION OF THE INVENTION

Figure 1:
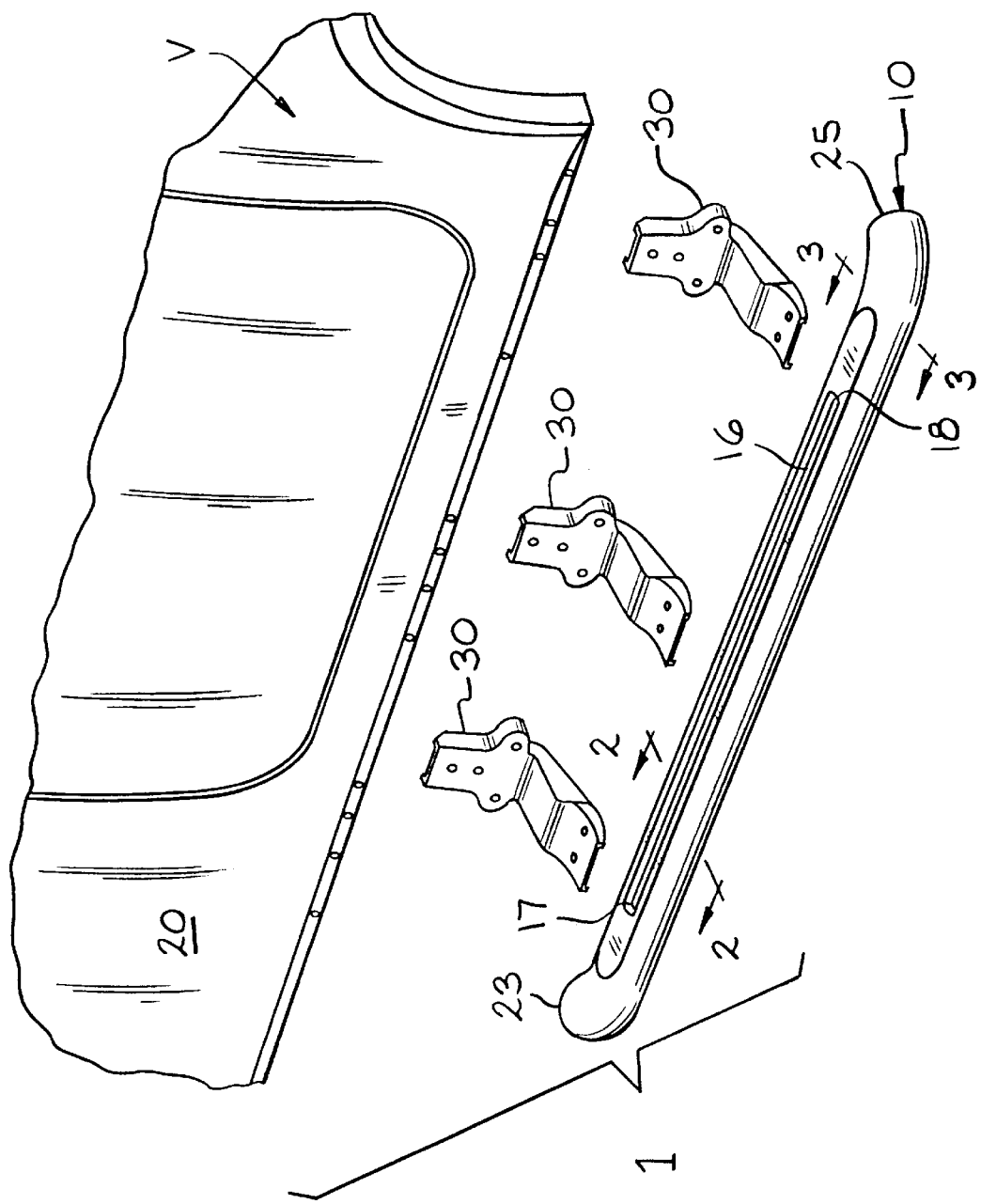
FIG. 1 is an exploded perspective view showing the running board of the present invention with a fragmentary portion of a motor vehicle and brackets for attaching the running board to the vehicle.
Figure 2:
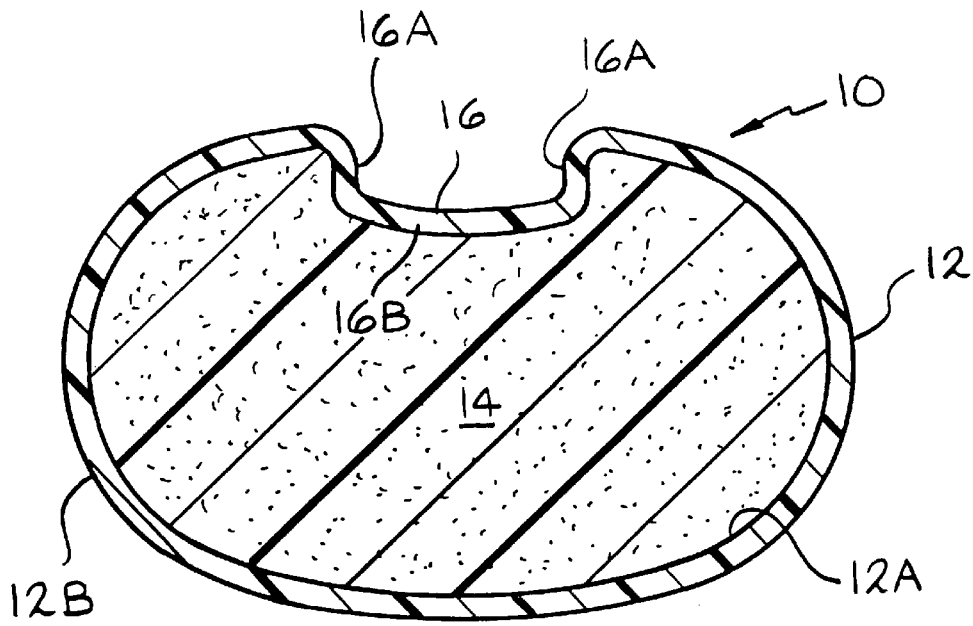
FIG. 2 is a sectional view taken through line 2—2 of FIG. 1.
Figure 3:
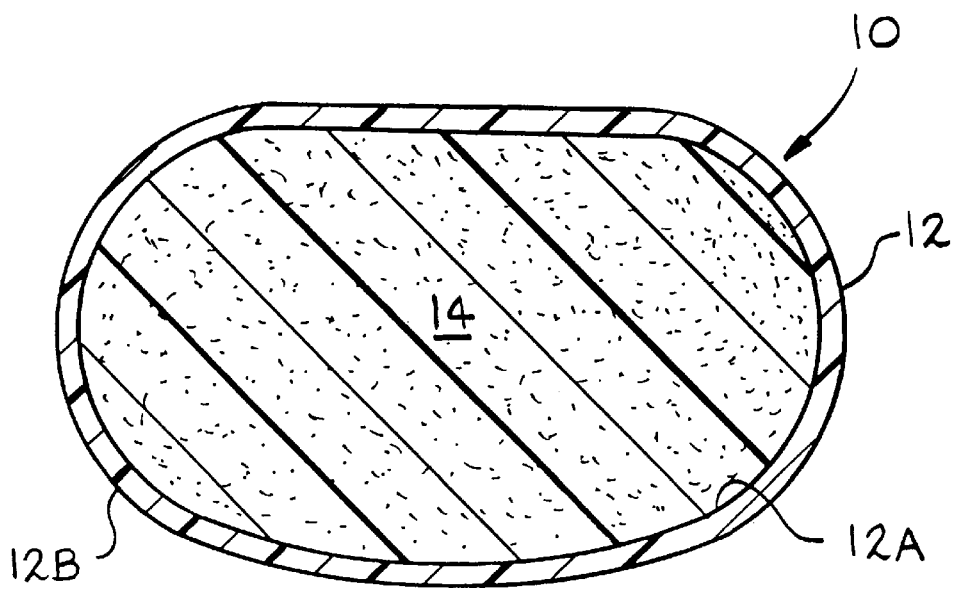
FIG. 3 is a sectional view taken through line 3—3 of FIG. 1.

Referring to FIGS. 1 through 3 there is shown a running board 10 which is suitable for use with a motor vehicle V by attachment to a side panel 20 by means of a plurality of metal brackets 30. The running board 10 comprises a blow-molded outer shell member 12 and an inner resilient closed-cell foam core 14. The foam core should have at least 85% of the cells closed. The outer shell 12 is preferably formed of a polycarbonate/polyester engineered thermoplastic such as that sold by GE Plastics as GE Xenoy 1402B. The core 14 is a closed-cell polyurethane, energy absorbing foam that can be best described as a rigid or structural polyurethane foam such as one sold by Bayer Corp. as Bayfill EA4007. As will be described in detail, the core 14 is formed by injecting the foamable plastic material such as the energy absorbing polyurethane foam as a liquid into a previously blow molded or otherwise formed outer shell 12 having an interior surface 12A and exterior surface 12B and causing such liquid to foam in place in the interior cavity of such shell 12 to completely fill the cavity defined by such interior surface 12A. Preferably the properties of the materials from which the outer shell 12 and the core 14 are formed are such that, despite the heat and pressure generated upon expansion of the closed cell polyurethane against the interior surface 12A of the outer shell 12, the plastic foam material of the core 14 will become moderately adhered or bonded to the interior surface 12A. The outer shell 12 has sufficient thickness and rigidity to withstand the heat and pressure generate therein when the polyurethane undergoes the foaming process. An average wall thickness of 3.5 mm for the outer shell 12 has proven to be satisfactory.

The running board 10 extends from a first end 23 to a second end 25 and includes a formed channel 16 which is shown in FIGS. 1 and 2 as facing upwardly when the running board 10 is secured to the vehicle V. The primary purpose of the channel 16 is to provide a recess in which a step pad (not shown) may be received and affixed. The channel 16 includes a pair of spaced apart walls 16A with a bottom 16B spanning therebetween which, in cross-section through the running board as shown in FIG. 2, follows a slightly curved configuration. The channel 16, and most particularly, the spaced apart walls 16A provide some stiffening and resistance to deflection from top loading resulting from a person stepping on the running board assembly. The channel 16 extends from a first end 17 to a second end 18.

The outer shell 12 must have sufficient breadth to readily accommodate the foot of persons stepping on the running board 10. For example, in the embodiment of FIG. 1, the breadth of the outer shell 12 from outermost point to outermost point in the areas between the brackets 30 such as that lying on line 202 was between 103 and 104 millimeters (mm).

In order to provide sufficient strength coupled with the required resilience, the foam core 14 must have a sufficiently great cross-sectional size in those areas at and between the brackets 30. The overall thickness of those areas of the running board 10 of the embodiment of FIG. 1 at the outer surface of the outer shell 12 was on the order of 53 mm. After taking into consideration the thickness of the outer shell 12, the presence of the channel 16 and the generally oval shape, the cross-sectional size of the foam core 14 is on the order of 36 to 37 square centimeters (cm$^2$).

A plurality of spaced apart brackets 30 supporting the lower portion of the running board 10 is used to fasten the running board to the vehicle V.

It is important that the brackets 30 themselves have sufficient strength an rigidity to support the expected loads to be placed on the running board without any significant deflection as excessive deflection of the brackets could result in excessive deflection and potentially permanent deformation of the running board rendering it commercially unsatisfactory. The brackets, when a direct load of 614 pounds is placed on a single bracket at the middle of the surface supporting the running board 10, should not deflect more than five millimeters (5 mm) as measured at the end of the bracket. Practical limitations suggest that the maximum spacing between the brackets 30 from centerline to centerline for a running board 10 having such breadth, thickness and foam core cross-sectional size and other properties described herein is 483 mm (19 inches). Greater spacing could result in excessive deflection and potentially permanent deformation of those portions of the running board between the brackets when subjected to maximum design loads. Thus, the assembly of the running board and the brackets combine to provide a commercially satisfactory unit capable of withstanding the rigors required for use with a motor vehicle.

Figure 4:
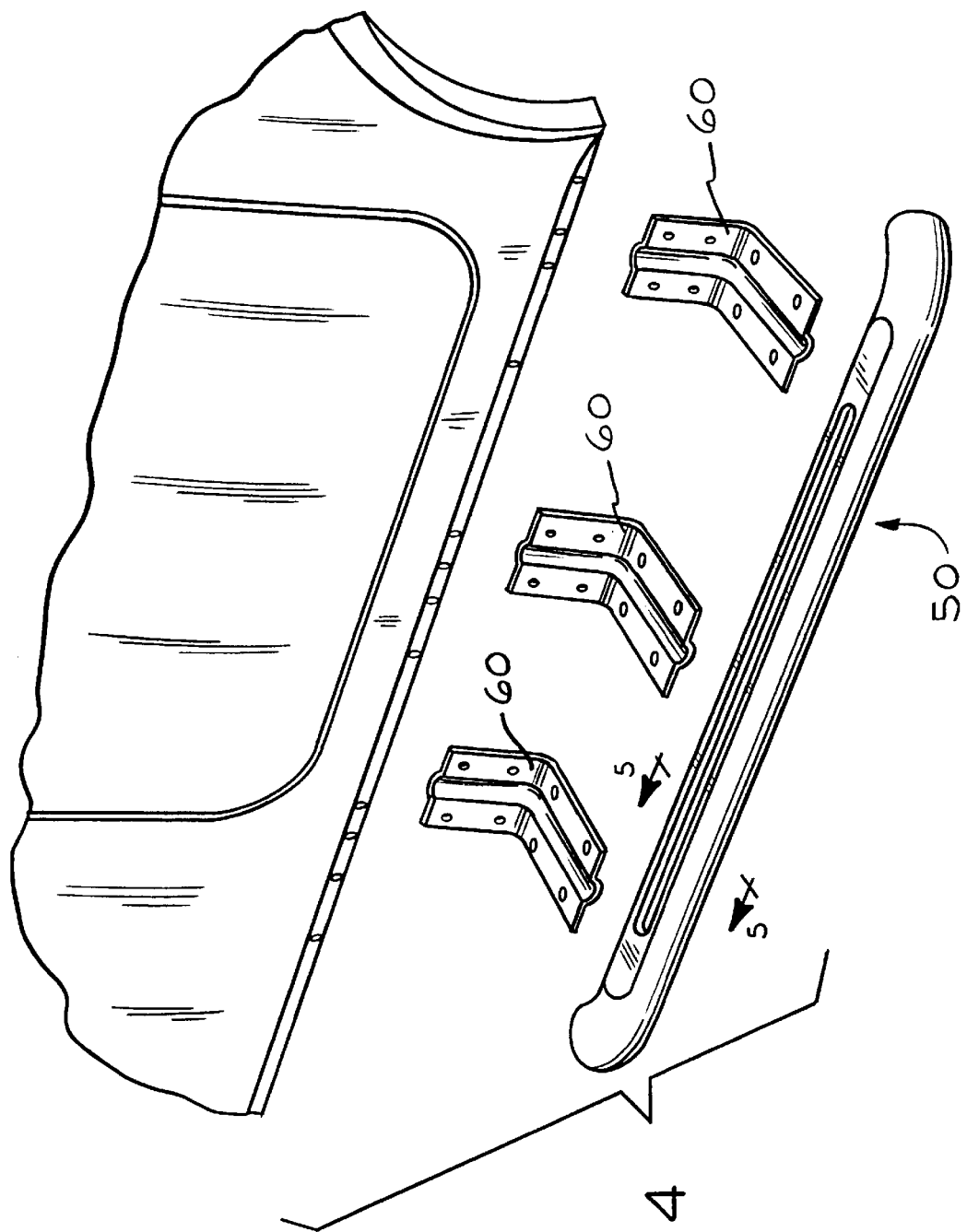
FIG. 4 is a view similar to FIG. 1 showing a modified running board with a different cross-sectional configuration and used with mounting brackets of different design.
Figure 5:
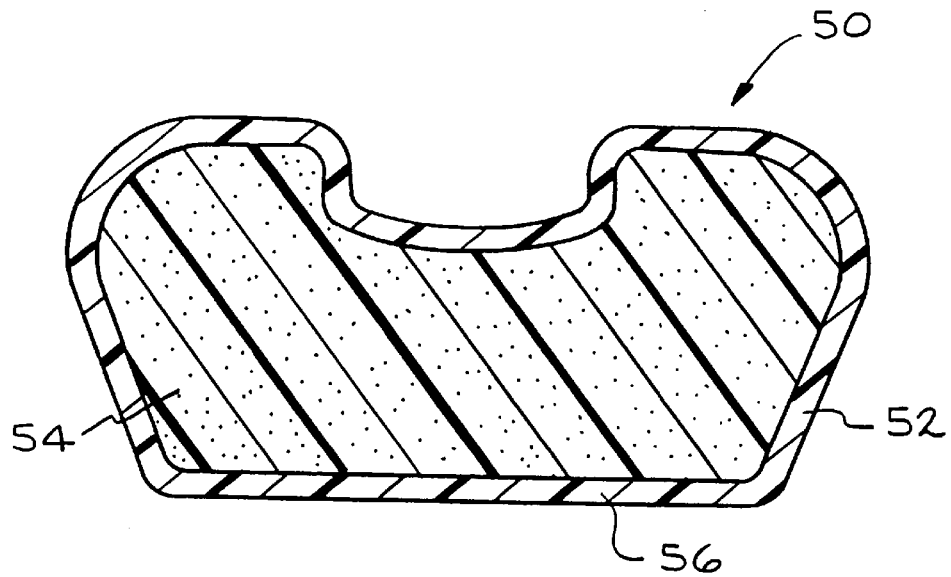
FIG. 5 is a sectional view taken through line 5—5 of FIG. 4.

Referring now to FIGS. 4 and 5, there is shown a modified running board 50 having a blow molded outer shell member 52 and an inner resilient closed-cell foam core 54. It is suitable for attachment to the side panel 20 of the motor vehicle V by means of a plurality of metal brackets 60. In this case, the metal brackets 60 are of a different type than the brackets 30 described with reference to the embodiment of FIGS. 1 through 3. Depending upon the length of the running board, four or more brackets may provided rather than the three metal brackets 30 and 60 illustrated, respectively, in the embodiments of FIGS. 1 and 4. This embodiment of running board 50 is similar to that described with respect to FIGS. 1 through 3 with the exception that it has a bottom 56 which is substantially flat or planar. The thickness of the running board 50 was slightly greater than the running board 10 of the embodiment of FIG. 1 and its cross-sectional size in the areas supported by and between the brackets 60 was on the order of 41 to 42 cm$^2$.

Figure 6:
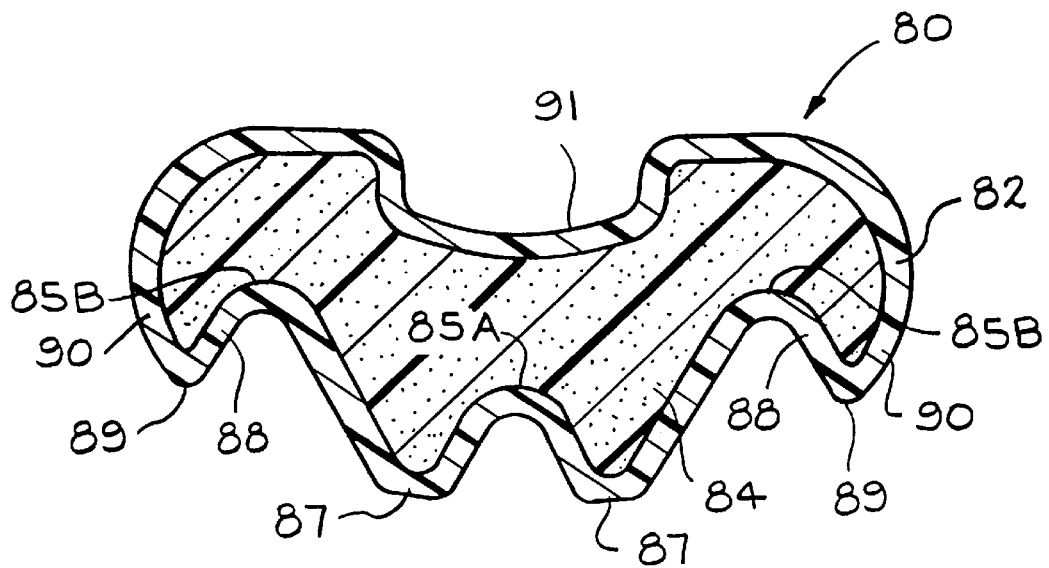
FIG. 6 is a sectional view of another embodiment of running board.

Referring now to FIG. 6, there is shown another embodiment of running board 80 having a blow molded or otherwise formed outer shell 82 and a foam core 84. The lower cross-sectional configuration of the running board 80 may be characterized as a ribbed configuration. It has a series of three ribs extending inwardly into the cavity occupied by the foam core 84 and upwardly from the bottom. A center rib 85A extends upwardly from a pair of elongated spaced-apart feet 87 and a pair of deeper outer ribs 85B, one on each side of the center rib 85A, each extend upwardly and outwardly from one of the feet 87. The upper portion of the running board is provided with a channel 91 for receiving a step pad as previously discussed.

The outer shell 82 is contoured to provide a downwardly and outwardly flaring wall portion 88 extending from each of the outer ribs 85B. Each of the outwardly flaring wall portions 88 to an outer foot 89 which join with a curved sidewall portion 90 and define therewith downwardly extending external outer ribs.

The ribs 85A and 85B along with the outwardly flaring wall portions 88 and feet 89 provide additional stiffening for the outer shell 82. As a result, the cross-sectional size of the foam core 84 was reduced from the size of the foam cores of the embodiments of FIGS. 2 and 5 and yet provided a running board which met the desired performance objectives. Thus, the cross-sectional area of the foam core 84 is on the order of 30 cm².

Figure 7:
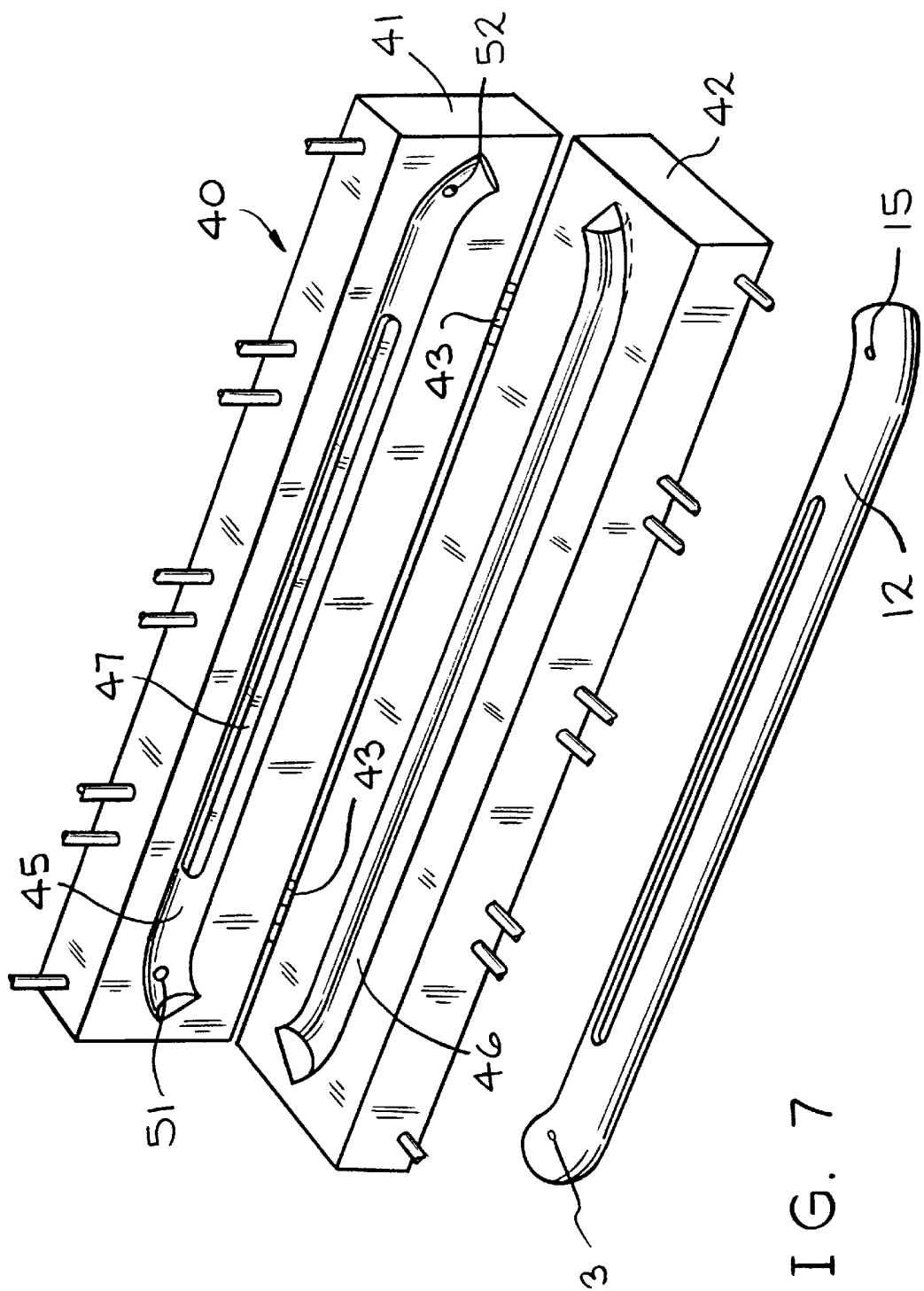
FIG. 7 is an exploded perspective view showing the running board of the present invention and the open halves of a mold having a molding cavity conforming to the exterior surface of the running board.
Figure 8:
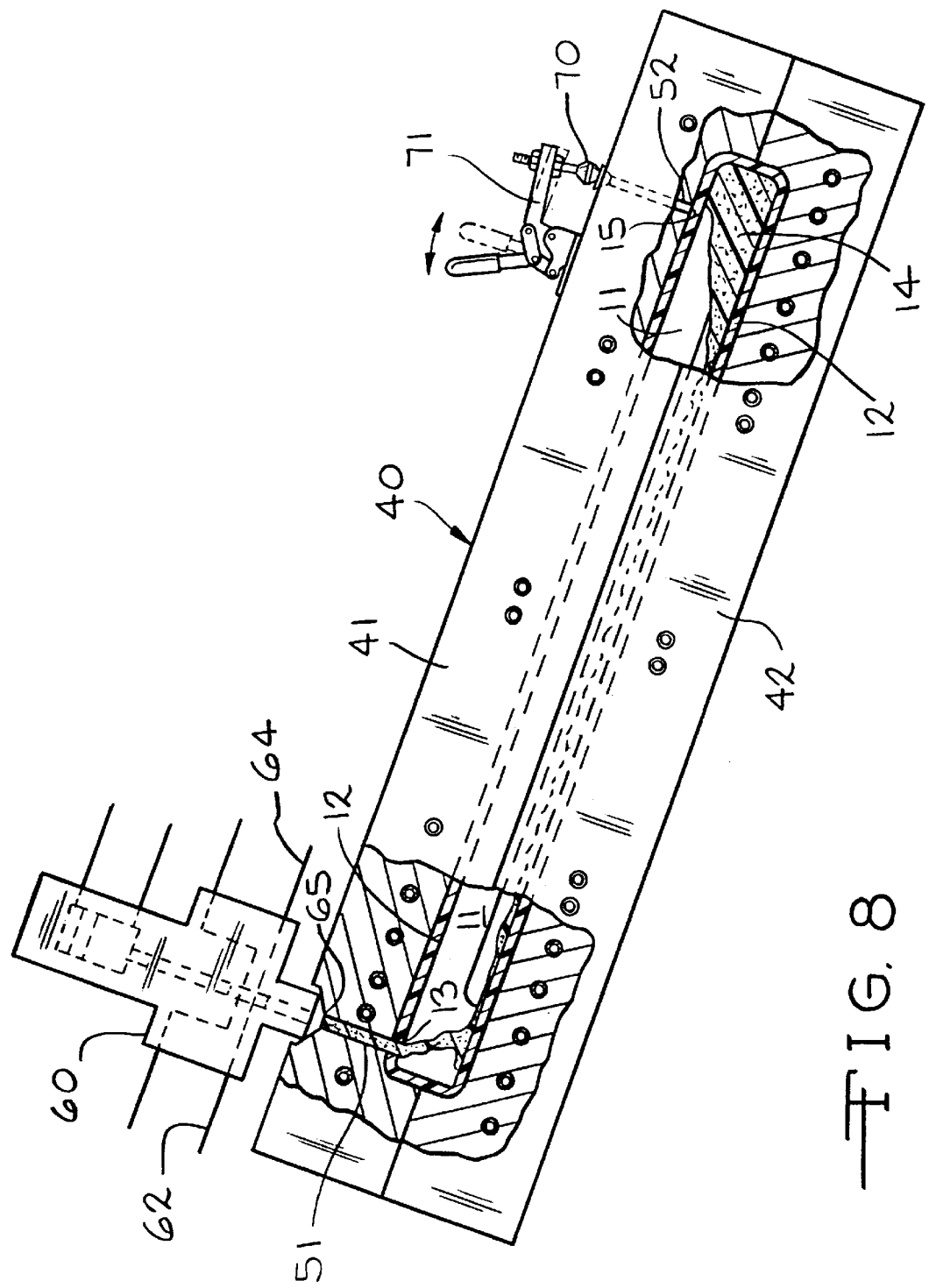
FIG. 8 is an elevational view partly in section showing the introduction of foamable plastic core material into a blow molded outer shell contained within the closed mold.

Referring now to FIGS. 7 and 8, there is shown a mold 40 having partible halves including a first mold half 41 and a second mold half 42 joined by hinges 43 for movement between an open position shown in FIG. 7 and a closed position shown in FIG. 8. The first mold half 41 has formed therein a cavity 45 and the second mold half 42 has formed therein a cavity 46. Extending into the cavity 45 of the first mold half 41 is an elongated rib 47 having a size to snugly fit in the channel 16 of the outer shell 12. When the mold halves 41 and 42 are closed, the mold cavities 45 and 46 cooperate to define a chamber sized and contoured to snugly receive the outer shell 12. The first mold half 41 is provided with a pair of channels, namely, an inlet channel 51 and an overflow/vent channel 52. The mold halves 41 and 42 are also provided with a plurality of flow passages 54 for receiving a fluid having a controlled temperature enabling the maintenance of predictable reaction of the foam and cooling as the foam exotherms.

As shown in FIGS. 7 and 8, the blow molded outer shell 12 is provided with a first aperture 13 which is aligned with the inlet 51 of the first mold half 41 and a second aperture 15 which is aligned with the overflow/vent aperture 52 of the first mold half 41.

In FIG. 8, there is shown a mixing head 60 for mixing isocyanate of the polyurethane formulation directed to the mixing head by a line 62 with polyol of the polyurethane directed to the mixing head by line 64. The mixing head 60 has an outlet orifice 65 positioned to communicate with the inlet channel 51 of the first mold half 41. These components are mixed, for example with 102.4 parts of isocyanate with 100 parts of polyol and then dispensed through the orifice 65 and through the inlet channel 51 and first aperture 13 and into the cavity 11 defined by the outer shell 12. Prior to introducing the mixed foamable material, the mold halves 41 and 42 are closed and clamped. For an outer shell 12 having a cavity 11 with a volume on the order of 6,900 cubic centimeters, approximately 1000 grams of foam is injected into the shell 12. As the liquid goes through the foaming process, air contained within the cavity 11 of the outer shell is vented through the second aperture 15 and overflow channel 52 and, after the introduction of the complete charge of liquid material through the first aperture 13 and inlet channel 51. A plug 70 formed of rubber or other resilient sealant material is mounted on a pivotable arm 71 and may be engaged to the overflow/vent channel 52 to prevent escape of an excessive amount of foam plastic material during the foaming process.

The running board of the present invention was tested for deflection under loads at room temperature and at temperatures of 88° C. and −40° C. according to a procedure under which it was initially subjected to a load of 614 pounds for three (3) cycles after which deflection and permanent set were measured. Thereafter the running board was subjected to a load of 305 pounds for approximately 20,000 cycles. In each case, the load was placed mid-way between adjacent brackets. After 20,000 cycles, the deflection and permanent set were measured. Each cycle consisted of a load on-set of three seconds, load hold of one second, unload of one second and five seconds with the load off.

The results of tests conducted on various embodiments of running boards described herein at various temperatures. In some tests the running board was supported with three (3) brackets spaced at 25 inches and in other tests it was supported with four (4) brackets. In the case of 4 brackets, the spacing between the brackets was 16.5" from centerline to centerline. As a result of the 3 bracket, 25 inch spacing, we recommend spacing to be no greater than 19 inches.

Figure 9:
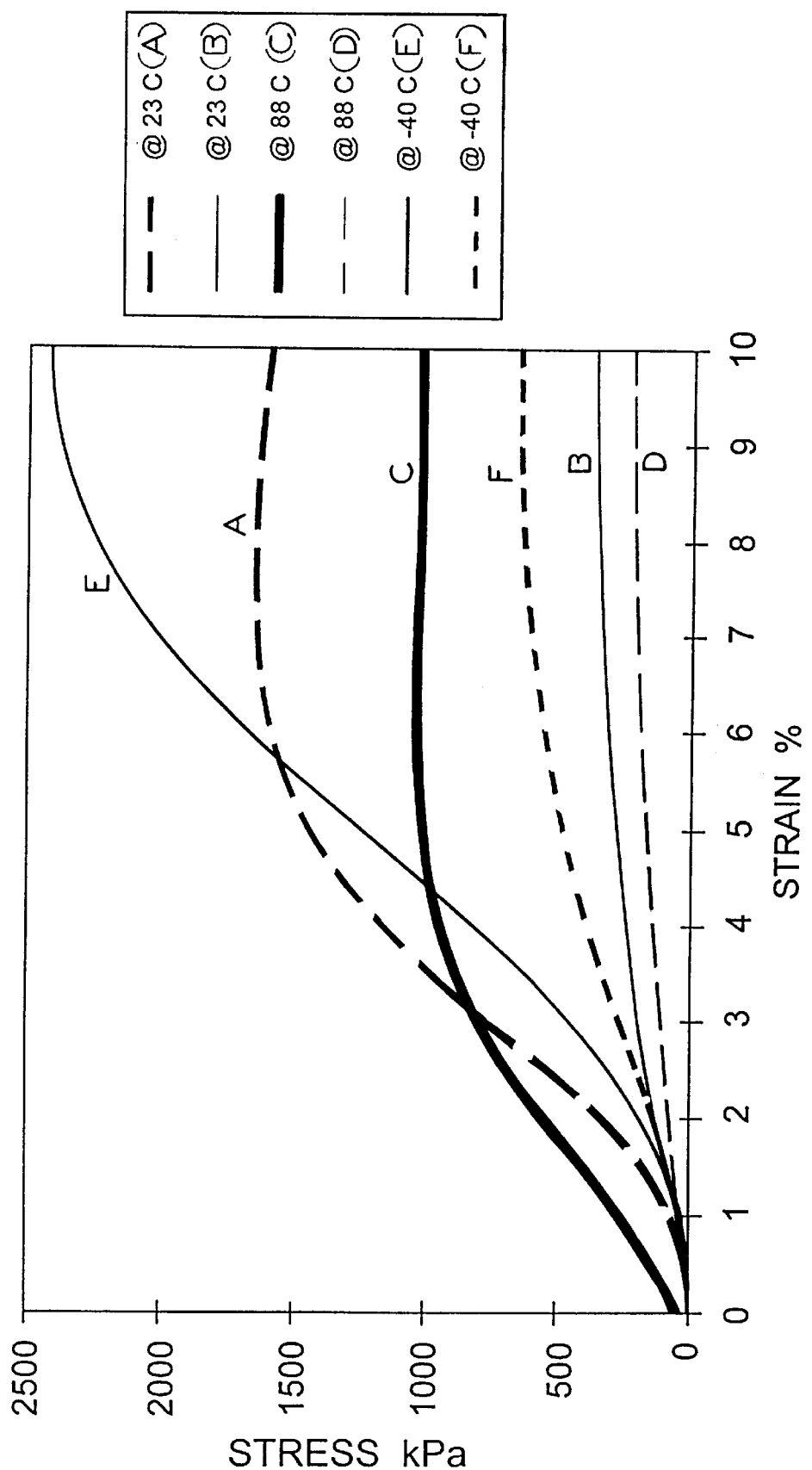
FIG. 9 is a graph showing the improved compression load-deflection of the inventive foam for the automotive part of this invention.
Figure 10:
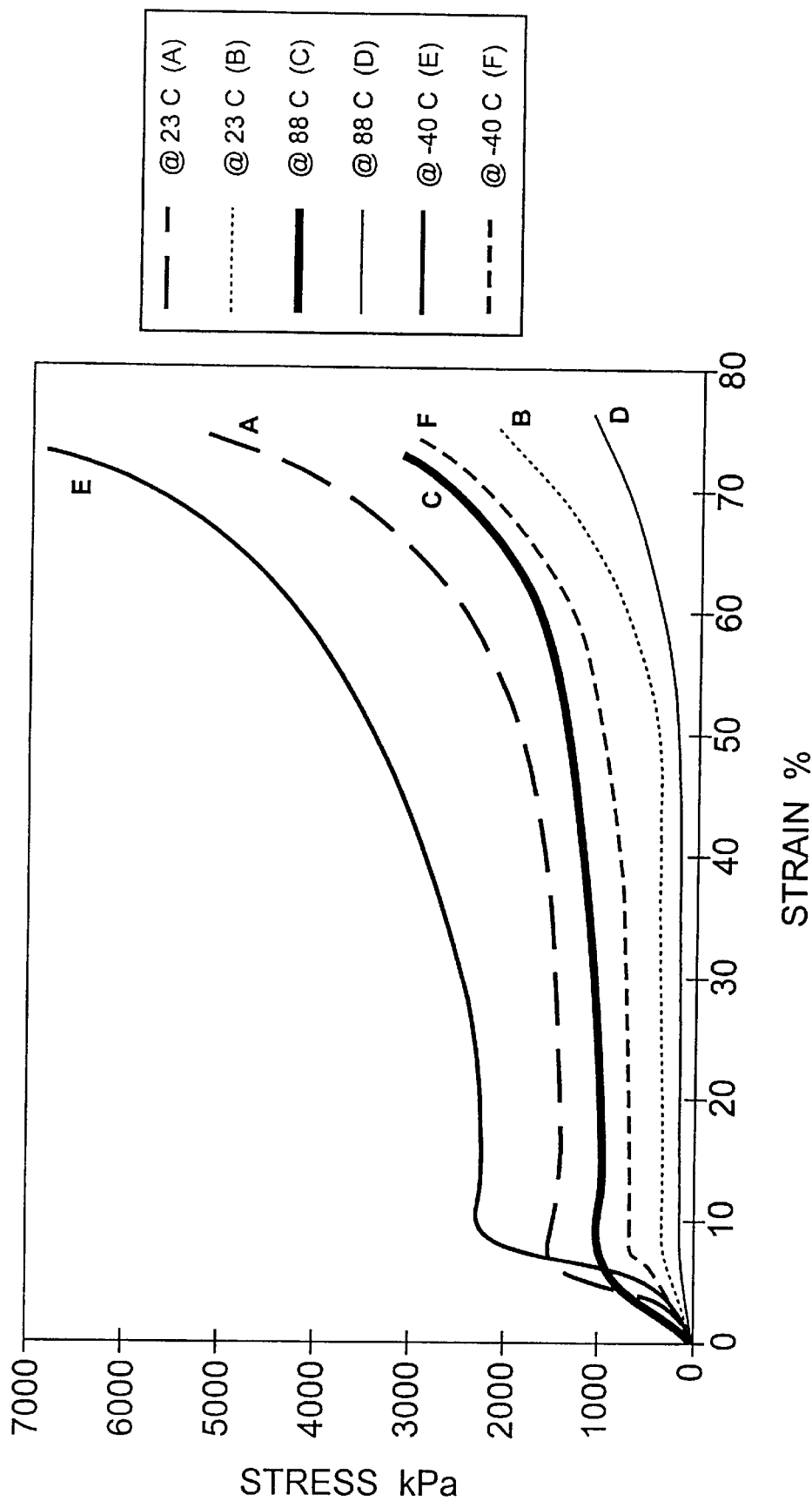
FIG. 10 is a graph showing the improved compression load-deflection of the inventive foam for the automotive part of this invention.

FIGS. 9 and 10 show a graph of compression load deflection vs. temperature. FIGS. 9 and 10 show the inventive foam (IF) superior to the prior art foam (PAF) at all temperatures. FIG. 9 shows superior properties over the first 10% of strain. FIG. 10 shows the improved properties over increased amounts of strain. The curves for the inventive foams are labeled A, C and E in each figure and the curves for the prior art foams are labeled B, D and F.

These graphs show the higher compression modulus for the inventive foam which may be the basis why the composite running board performs well in durability tests. This tells us that compressive modulus is very important to the form's ability to stiffen the running board, because the higher compressive modulus means the foam can be subjected to huge loads and only sustain a small deflection.

Figure 11:
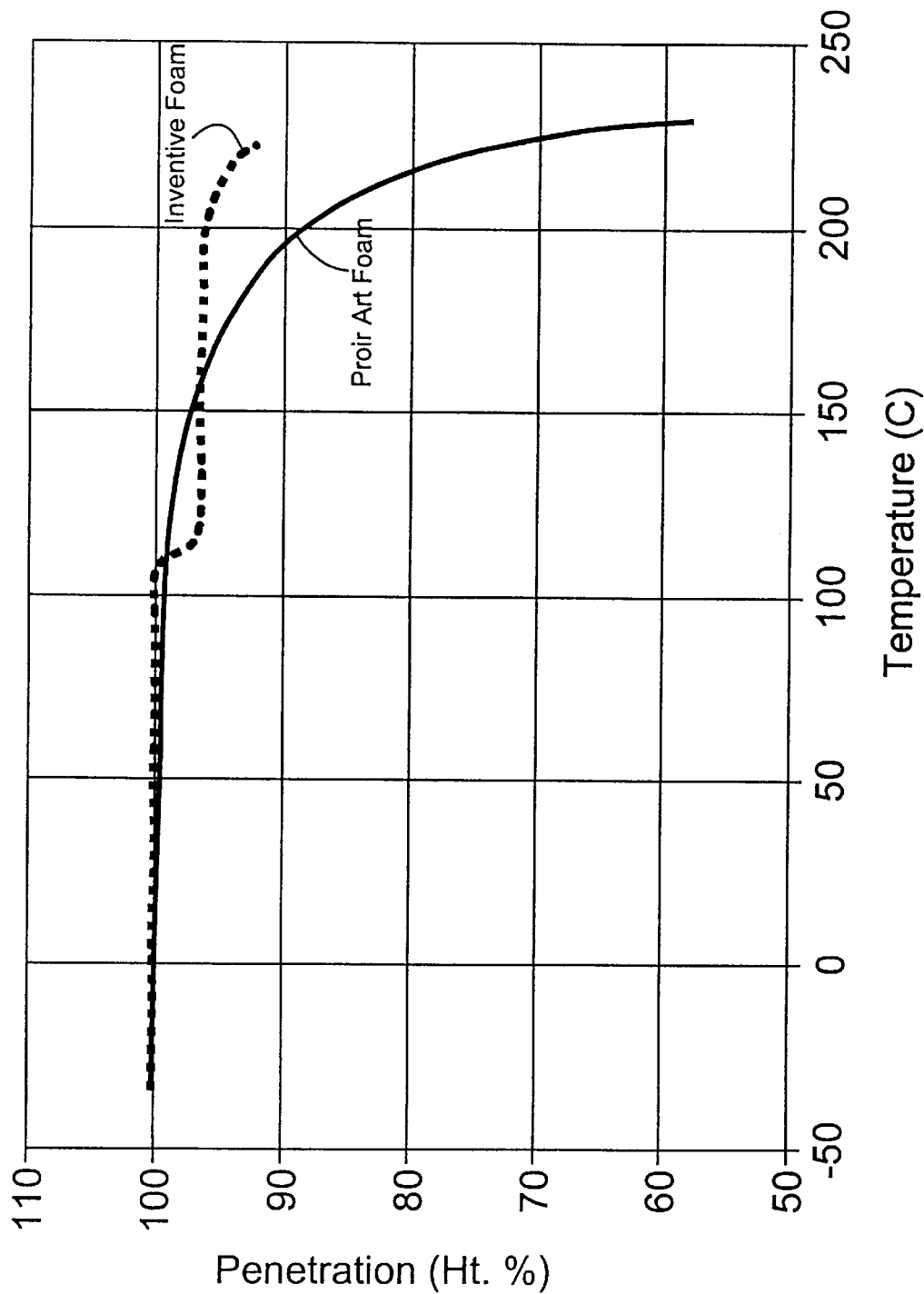
FIG. 11 shows the improved thermal mechanical analysis of this invention.

FIG. 11 shows thermal mechanical analysis demonstrating the superior performance of the inventive foam. FIG. 11 shows the improved penetration of the inventive foams with increased temperature at a constant force.

Tables I and II show the improved performance of these running boards as compared to prior art OEM steel tube design running boards. The data of Tables I and II show the improved deflection and permanent set of the running boards of this invention. The data show the running boards of this invention to be as good as, and in some cases, better than OEM steel tube running boards. The data demonstrates the improved stiffening of the running boards. The higher compressive strengths and better thermal mechanical properties means the running boards can be subjected to huge loads and only sustain a small deflection with minimal permanent set.

The maximum deflection of the running board at a location on center between brackets is no greater than 15 mm (millimeters). The maximum permanent set of the running at a location on center between brackets is no greater than 5 mm (millimeters).

TABLE I

| Test Conditions | Cycles | Max Deflection | | Permanent Set | |
|---|---|---|---|---|---|
| | | inches | mm | inches | mm |
| (RIB DESIGN/RIB BRACKET) (Deflection & Permanent Set Under Load Location on Center Between Brackets) | | | | | |
| (3) brkt-614lb-88C PC/PBT | 3 | 1.121 | 28.47 | 0.072 | 1.83 |
| (3) brkt-305lb-88C PC/PBT | 9,800 | 0.599 | 15.21 | 0.281 | 7.14 |
| (4) brkt-614lb-88C PC/PBT | 3 | 0.555 | 14.09 | 0.048 | 1.22 |
| (4) brkt-305lb-88C PC/PBT | 19,803 | 0.294 | 7.46 | 0.156 | 3.96 |
| (4) brkt-614lb-23C PC/PBT | 3 | 0.412 | 10.46 | 0.156 | 3.96 |
| (4) brkt-395lb-23C PC/PBT | 43,000 | 0.224 | 5.68 | 0.156 | 3.96 |
| (4) brkt-614lb(−)40C PC/PBT | 3 | 0.306 | 7.77 | 0.156 | 3.96 |
| (4) brkt-305lb(−)40C PC/PBT | 20,000 | 0.159 | 4.03 | 0.156 | 3.96 |
| (FLAT BOTTOM DESIGN/RIB BRACKET) (Deflection & Permanent Set Under Load Location on Center Between Brackets) | | | | | |
| (4) brkt-614lb-88C PC/PBT | 3 | 0.481 | 12.21 | 0.061 | 1.55 |
| (4) brkt-305lb-88C PC/PBT | 10,000 | 0.250 | 6.35 | 0.121 | 3.07 |

TABLE II

Prior Art
(OEM STEEL TUBE DESIGN/OEM BRACKET)
(Deflection & Permanent Set Under Load
Location on Center Between Brackets)

| Test Conditions | Cycles | Max Deflection | | Permanent Set | |
|---|---|---|---|---|---|
| | | inches | mm | inches | mm |
| (3) brkt-614lb-88C STEEL | 3 | 0.532 | 13.51 | 0.094 | 2.38 |
| (3) brkt-305lb-88C STEEL | 10,000 | 0.333 | 8.46 | 0.069 | 1.75 |

Note:
• 3 bracket spacing = 25 inches
• 4 bracket spacing = 16½ inches

Although the present invention has been described in relation to a running board, it should be understood that its broad concepts could be used in a wide variety of structural members.

Many revisions may be made to the above-described embodiments without departing from the scope of the present invention or from the following claims.

We claim:

1. A running board having an original shape comprising:
   an outer shell of molded plastic defining a cavity; and
   a core of polyurethane foam having a density in the range of 110 kg/m³ to 150 kg/m³, the foam having sufficient resiliency to permit the running board to return to substantially its original shape following removal of a load of predetermined magnitude;
   the running board extending from a first end to a second end and having an upwardly facing portion positioned to receive a load placed thereon and a downwardly facing portion, wherein the running board, when supported by a plurality of brackets and when subjected to a 305 pound vertical load placed on the upwardly facing portion at a location on center between brackets, has a maximum deflection no greater than 15 millimeters and a maximum permanent set no greater than 5 millimeters.

2. A running board according to claim 1 wherein the molded plastic is a blow molded thermoplastic.

3. A running board according to claim 1 wherein the molded plastic is a blow molded thermoplastic that includes a polycarbonate.

4. A running board according to claim 1 wherein the molded plastic is a blow molded polycarbonate/polyester engineered thermoplastic.

5. A running board according to claim 1 wherein the molded plastic is a blow molded polycarbonate/polybutylene terephthalate engineered thermoplastic.

6. A running board according to claim 1 wherein the polyurethane foam is an energy absorbing foam.

7. A running board according to claim 1 wherein the vertical load is 614 pounds.

8. A running board according to claim 1 including a plurality of spaced apart brackets supporting the running board at spaced apart areas of the downwardly facing portion.

9. A running board according to claim 8 wherein the running board, when a direct load of 614 pounds is placed above a single bracket at a middle point on the upwardly facing portion above the single bracket, has a deflection not more than five millimeters (5 mm) as measured at an end point of the single bracket.

10. A running board according to claim 8 wherein the core between adjacent brackets has a cross-sectional size of at least 30 square centimeters.

11. A running board according to claim 8 wherein brackets are spaced apart a distance not to exceed 19 inches.

12. A running board according to claim 8 wherein brackets are spaced apart a distance of 16.5 inches.

13. A running board assembly according to claim 8 wherein the downwardly facing portion of the outer shell defines a plurality of longitudinal ribs in the areas between said brackets.

* * * * *